July 10, 1951 P. F. M. GLOESS ET AL 2,560,434

DEVICE FOR TRANSLATING DURATION OR TIME MODULATED PULSES INTO CODED PULSES

Filed April 28, 1949 4 Sheets-Sheet 1

INVENTORS
PAUL FRANCOIS MARIE GLOESS
LOUIS JOSEPH LIBOIS
BY Haseltine, Lake & Co.
AGENTS INVENTORS
PAUL FRANCOIS MARIE GLOESS
LOUIS JOSEPH LIBOIS
BY Haseltine Lake & Co
AGENTS INVENTORS
PAUL FRANCOIS MARIE GLOESS
LOUIS JOSEPH LIBOIS
BY Haseltine Lake & Co.
AGENTS INVENTORS
PAUL FRANCOIS MARIE GLOESS
LOUIS JOSEPH LIBOIS
BY Hazeltine Lake & Co.
AGENTS Patented July 10, 1951

2,560,434

UNITED STATES PATENT OFFICE 2,560,434

DEVICE FOR TRANSLATING DURATION OR TIME MODULATED PULSES INTO CODED PULSES

Paul François Marie Gloess and Louis Joseph Libois, Paris, France

Application April 28, 1949, Serial No. 90,251
In France July 27, 1948

3 Claims. (Cl. 332—1)

Figure 1:
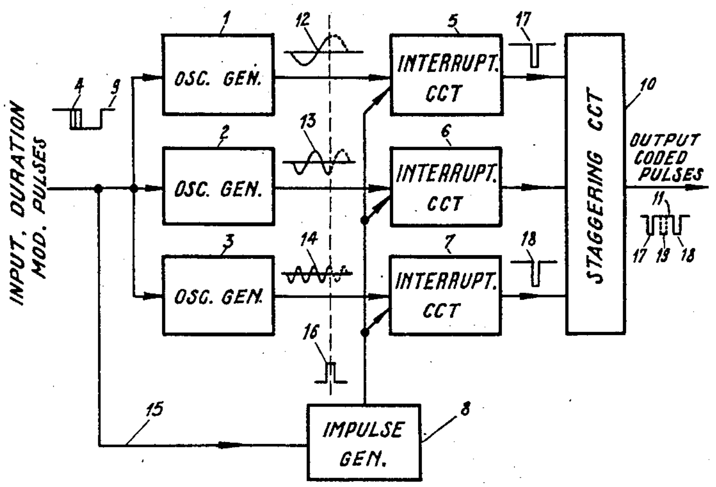

The present invention concerns a method and apparatus for the transmission of modulated electric signals by means of coded impulses characterizing the modulation value of the signals to be transmitted.

It is known that in the usual system of transmission by electrical impulses, the value of the modulation carried by one impulse is determined by the value of a variable characteristic of the impulse, for instance its amplitude or its duration or its position in time with respect to a predetermined position, corresponding to a modulation of a predetermined value.

In certain systems for electrical transmission by coded impulses recurrent impulses are first modulated in a known manner which may further represent the individual modulations of several communication channels. The maximum value of the range of variation of the modulation characteristic is then divided into a predetermined integer number of discrete levels. The integer number corresponding to the rank of the discrete level, just exceeding or just falling short of the actual value of the modulation characteristic of the impulse is then counted, an impulse code combination is made to correspond to each such defined number and this code combination is finally transmitted instead of the original impulse. Such a system is described, for instance, in U. S. Patent 2,272,070 of February 3, 1942, by A. H. Reeves.

It is convenient, in practice, to count the discrete levels in the binary system in which N code impulse positions correspond to $2^N$ elementary discrete levels. The advantage of the binary system is that it utilizes only two digits, 0 and 1, which may be translated by the presence or absence of an impulse in a given sequence of code elements.

If, for example, the maximum value of the variable modulation characteristic of the original impulses is divided into 32 elementary discrete levels, preferably equal, the 32 different values thus determined of this characteristic may be transmitted by means of at most five impulses, i. e. by means of a five element code. In fact, if it be assumed that the value of this characteristic is measured as an inexact value, then a value smaller than one value corresponds to 0, for which no pulse is transmitted, and the maximum value is slightly higher than 31 which number in the binary system is written 11111, i. e.

$$2^4+2^3+2^2+2^1+2^0$$

Further, a value located for instance between three and four values, thus corresponding to the number 3, is written 00011, and is transmitted by means of two code impulses only. On the other hand, a value equal to 18 elementary values will also be transmitted by means of two code impulses, this value being written 10010 in the binary system, but these two impulses will occupy time positions different from those which correspond to the number 3. Thus a relatively small number of impulse positions, i. e. of code elements, enable the transmission of a high number of values of elementary values and, consequently, a transmission with satisfactory fidelity of the modulation carried by the original impulses.

The object of the present invention is a new method for the production of coded impulses and electronic devices and circuits for the putting into practice of this method.

The method for the production of coded impulses in accordance with the invention makes use of original impulses which have first been modulated in duration or by time displacement. It consists in creating simultaneously with, and in response to, the appearance of each original modulated impulse, a plurality of series of what may be termed electric signals or pulsations, the number of such series being equal to the number of the code elements, and the periods of the signals constituting the elements of the respective series being proportional to the maximum value of the variable modulation characteristic of the original impulses in accordance with successive integer powers of 2, the exponent of the highest power being equal to the number of the code elements less one. The signals of each series are analyzed at a given instant of the recurrence period of the original impulses and a code impulse is produced or not at the instant of analysis according to whether those signals offer or not a predetermined characteristic.

More specifically, the invention relates to a method for converting into coded impulses, duration impulses modulated, for instance, by a displacement of their leading edges. This method consists in producing simultaneously with the appearance of an impulse whose maximum modulation is T, series or trains of oscillations whose individual periods are respectively equal to T, T/2, T/4 . . . $T/2^{N-1}$, N being the number of the code elements. The polarity of these oscillations is analyzed at an instant close to the end of the modulated impulse, and a code impulse is produced by each one of such oscillations which, at that instant, offers a given polarity.

According to a modification which is equally important, the invention relates also to a method for converting into coded impulses, impulses which are modulated by displacement in time, the maximum magnitude of this time displacement being T. This method consists in producing simultaneously with the appearance of a modulated impulse, series of rectangular impulses or signals whose time limits or terms have durations respectively equal to T/2, T/4 . . . $T/2^N$, N being the number of the code elements. The presence or absence of a term of the impulse series at an instant close to the end of the time interval allocated to the modulation of an original pulse is determined and a code impulse is produced by means of each one of those rectangular signals whose presence or absence has been detected at the instant of the analysis.

According to the invention and relating to devices for carrying it into operation, a system for the production of coded impulses from duration modulated impulses, for instance, by a displacement of their leading edges, comprises generators of oscillatory signals equal in number to the number of code elements, said generators having respectively periods T, T/2, T/4 . . . $T/2^{N-1}$ and being simultaneously put into operation for the duration of the original modulated impulse, means for anaylzing the polarity of each one of these signals at the end of the original impulse, and means for producing a code impulse for each one of these signals whose polarity has a predetermined sign at that instant.

According to another characteristic of the invention and relating to another coding device, a system for the production of coded impulses from impulses modulated by time displacement comprises generators of rectangular signals in series, the series being equal in number to the number of code elements and delivering rectangular impulses of durations respectively equal to T/2, T/4 . . . $T/2^N$, during the period T corresponding to the maximum modulation displacement of the original impulse, means for determining the presence or absence of a signal of each series at the end of the interval T and means for generating or not a code impulse according to whether such a signal is present or not at that time.

According to another characteristic of the invention, whereas the analysis takes place exactly at the end of the original impulse or in the case of a time position modulated impulse, at a predetermined instant of fixed time position with respect to that of zero modulation of said impulse, an auxiliary device for the breaking up into elementary values the value of the modulated impulse which will be called, for lack of a better term, a "quantification" device, shifts the instant of analysis by a time interval smaller than the duration of an elementary value in order that, at that instant, the polarity of the auxiliary signals (oscillations or rectangular signals) be sharply characterized.

Figure 2:
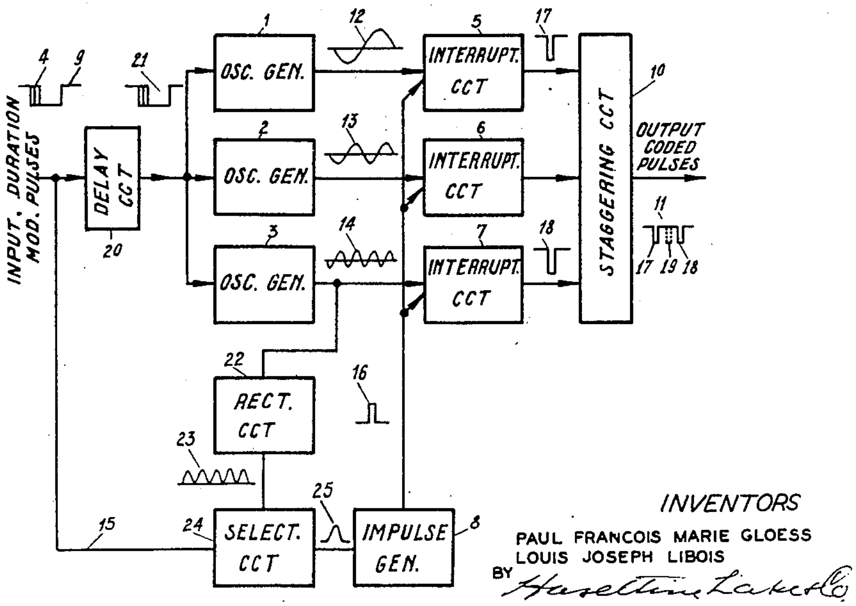
Figure 3:
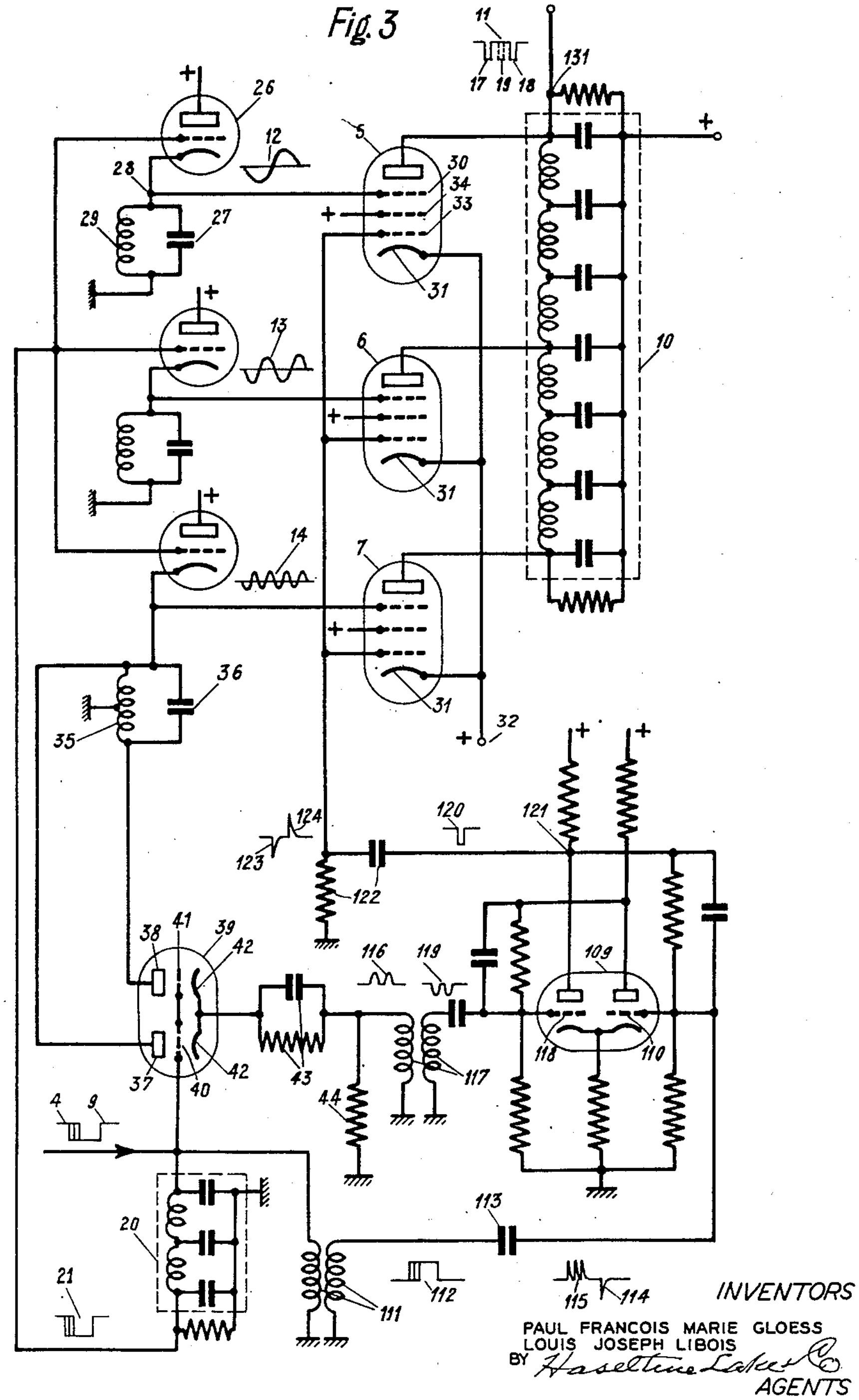
Figure 4:
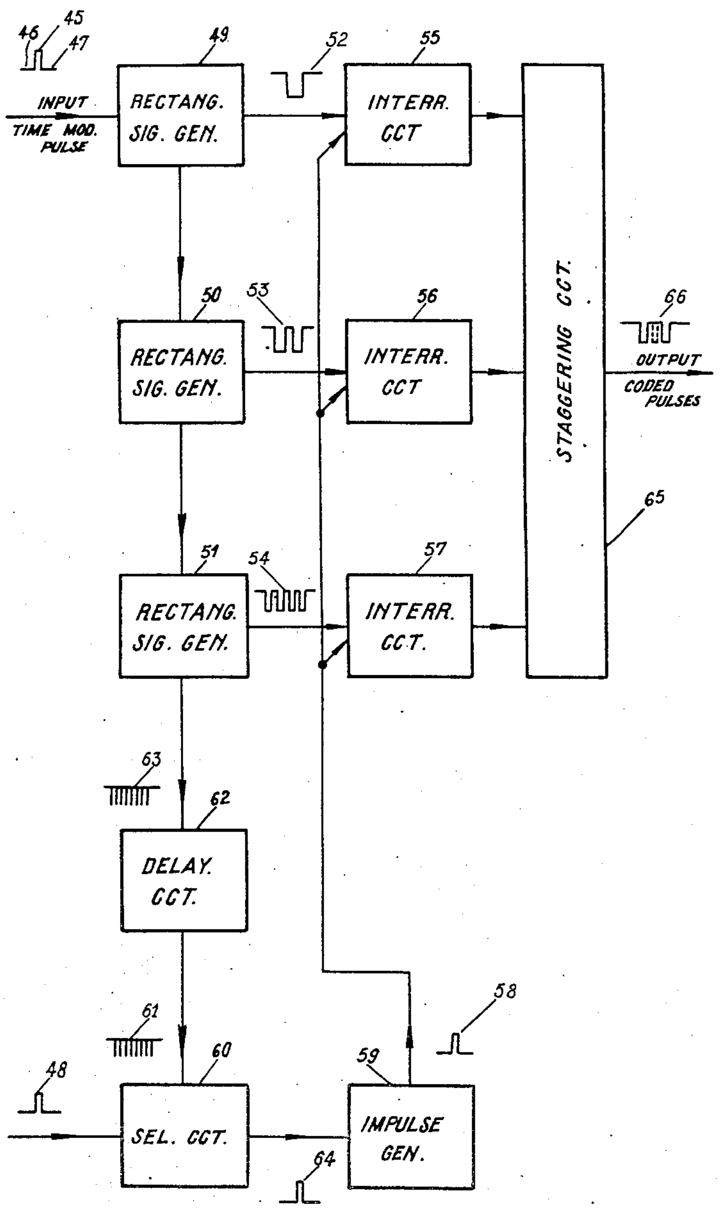
Figure 5:
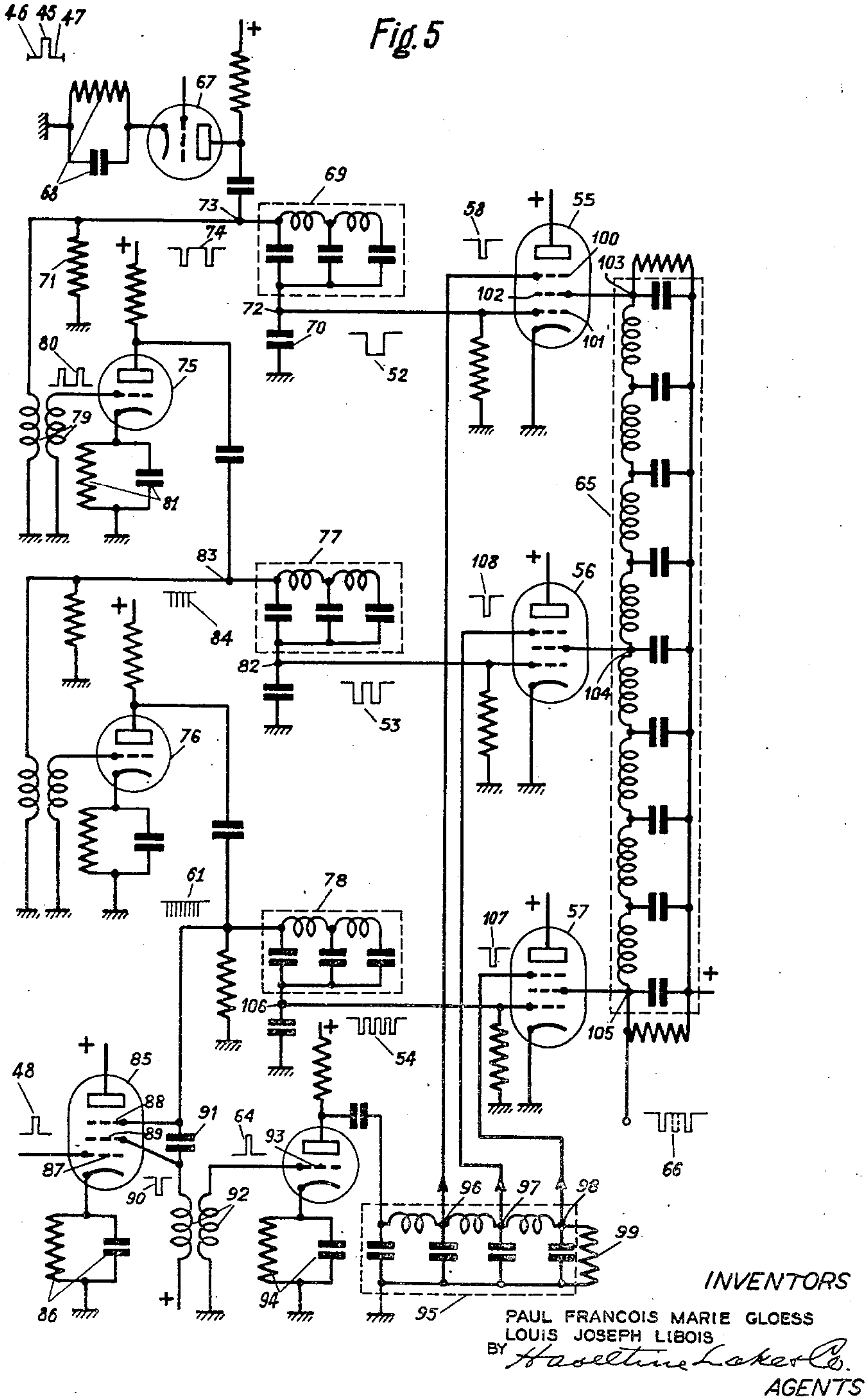

Other objects and characteristics of the invention will appear from the description of particular examples of embodiments which will now be given. This description will be made with reference to the appended drawings wherein:

Figure 1 schematically shows a system for the production of coded impulses from duration modulated impulses;

Figure 2 schematically shows a device similar to that of Figure 1, provided with a "quantification" system;

Figure 3 schematically shows an electric circuit utilizing the characteristics of a system such as that of Figure 2;

Figure 4 schematically shows a system for the production of coded impulses from time displacement modulated impulses; and Figure 5 schematically shows a more detailed electric circuit utilizing the characteristics of a system such as that of Figure 4.

For greater simplicity, there have been represented on the drawings systems utilizing a three-element code, thus making it possible to define $2^3$, that is to say eight elementary values. But it must be understood that this number of elements could be different and, in particular, higher, as will appear from the description.

Figure 1 shows, in a very schematic manner a system enabling the production of coded impulses from duration modulated impulses. It has been assumed that only the leading edge of these impulses is modulated but the invention could apply just as well to the case when the trailing edge or both edges of the impulses are modulated.

In the case considered, when the code comprises three elements, the system comprises three generators of pulsations or signals indicated at 1, 2 and 3. If T again designates the maximum duration of the incoming modulated signals 4, the respective periods of the three generators are T, T/2, and T/4. Further, their operation is exactly limited to the duration of the incoming impulse 4, not taking into account a short damping period. Of course, in the case of a code with N elements, N generators would be used and the period of the $n$th generator would be $T/2^{n-1}$.

Each one of the generators is respectively connected to one of three electronic interrupters or gating amplifiers 5, 6 and 7, supplied on the other hand by a common impulse generator 8 which is controlled by the termination 9 of the incoming impulse. Each one of the interrupters enables the oscillation applied to it at the termination 9 of the impulse 4 to be transmitted only if this oscillation offers at that instant a predetermined polarity. A staggering circuit 10 receives those code impulses which have passed through the interrupters 5, 6 or 7 and suitably staggers them in time giving a resulting coded signal such as 11. This staggering circuit may consist in a delay line provided at its ends with suitable termination resistances and with a number of taps to which the outputs of the interrupters (or gating amplifiers) 5, 6, 7, are respectively connected.

The oscillatory signals from the generators 1, 2 and 3 are represented respectively at 12, 13 and 14. They begin at the same time as the variable leading edge of the incoming impulse 4 and end at the same time as that impulse. On the other hand, the fixed trailing edge 9 of impulse 4 controls, through the lead 15 the operation of the generator 8 which delivers an impulse 16 coinciding in time with this fixed edge 9 and, consequently, with the end of the signals 12, 13 and 14.

In the example shown, the polarity of the end of signal 12 is positive, that of signal 13 is negative and that of signal 14 is positive. Assuming that the interrupters 5, 6 and 7 on receiving the control pulse 16 operate if the polarity applied to them otherwise is positive, an impulse 17 is thus obtained at the output of the interrupter 5, nothing is obtained at the output of 6, and a pulse 18 is obtained at the output of the interrupter 7. After passage through the mixer 10, a signal such as 11, for instance, is obtained. On Figure 1, the position reserved for the impulse when issuing from the interrupter 6 has been represented in dotted lines at 19.

It may be noted that if some of these oscillatory signals terminate in the immediate vicinity of an alternation change, the slightest lack of adjustment of one of the circuits may cause the appearance of a wrong polarity and lead to the production of an incorrect code which does not correspond to the duration of the incoming impulse.

To avoid this drawback and according to the invention, an improved coding circuit is used. This circuit, as represented on Figure 2 comprises a "quantification" device making it possible to adjust in a suitable manner the time of appearance of the analysis impulse 16. This device is for the purpose of causing the analysis to occur during a maximum or a minimum of the oscillation 14 having the highest frequency; thus the polarity of the various oscillations is clearly defined at the instant of analysis. In fact, oscillations such as 12 and 13 go through zero value only at the same time as one of the oscillations 14 and therefore have an appreciable amplitude at the time when the oscillations 14 reach a maximum absolute value.

On Figure 2, the elements which correspond to those of Figure 1 are designated by the same reference numbers.

The general operation of the circuit is identical with that of the circuit of Figure 1, but the system is completed by the following elements:

A delay circuit 20 shifts the incoming impulse 4 by a time interval $T/2^N$; in the example shown, this shift is T/8. There is thus obtained an impulse 21, identical with the impulse 4, but delayed by T/8 and it is this impulse which is applied simultaneously to the generators 1, 2 and 3.

Further, a circuit 22 rectifies the two alternations of the signal 14 from the generator 3 and thus produces the signal 23. A selector circuit 24, supplied simultaneously by the incoming impulse 4 and by the signal 23 passes only that peak of the signal 23 which appears immediately after the termination 9 of the impulse 4. An impulse 25 is thus obtained which is applied to the generator 8 and which controls the production of the unblocking impulse 16. The latter is thus centered about a positive or negative maximum of the oscillation 14 and, consequently, causes the analysis to take place at a time when the polarities of the various auxiliary oscillations 12 to 14 are well determined, even if the generators 1, 2, 3, or some of these generators, are slightly out of adjustment.

An example of embodiment of a circuit according to the system of Figure 2 is shown on Figure 3.

Each one of the generators 1, 2 and 3 consists of an electronic tube such as 26, whose cathode is connected to earth through a resonant circuit including a capacity 27 and an inductance 29, in parallel connection. The resonant frequency of this circuit is made equal to $2^{n-1}/T$ for the $n$th generator; thus in the present case, these frequencies are respectively 1/T, 2/T and 4/T.

The operation of generator 1 will be described, hereinafter, by way of example. The tube 26, having no grid bias, the circuit 27—29, normally is traversed by constant anode current of the tube and no signal voltage is developed at point 28. On the contrary, during the duration of the delayed pulse 21 as this delayed pulse 21 is assumed to be of negative polarity and large amplitude, the tube 26 is blocked, its anode current is suppressed and the energy previously stored in the inductance 29 and the capacity 27 gives rise at 28 to the signal 12.

At the termination of the impulse 21, the tube 26 becomes conducting again and very strongly damps the circuits 27—29 which almost immediately cuts off the signal 12. Since this signal begins every time with a negative polarity, its polarity at the time when it is interrupted only dependes on the duration of the control impulse 21 and on the natural oscillation period of the circuit 27—29.

The analyzer-interrupter 5 is consituted by a pentode electron tube. The signal 12 is applied to the suppressor grid 30 of this tube whose anode current is normally blocked by a positive bias given to the cathode 31 by a suitable source connected at 32. At the time of analysis, however, a positive impulse 124 corresponding to impulse 16 of Fig. 2, and whose formation will be explained later, is applied to the control grid 33 of the tube 5. A current can only flow through the anode circuit of the tube if the suppressor grid 30 is raised to a positive voltage simultaneously with the application of impulse 124 to grid 33; i. e. if the signal 12 terminates on a positive alternation, and anode current impulse 17 occurs and is transmitted to the staggering circuit 10. If, on the contrary, the signal 12 terminates on a negative alternation, the current of the tube 5 is absorbed by its screen electrode 34 and no current is transmitted to the staggering circuit 10. Current impulses such as 17 constitute the coded signals and are received at the output terminal 131 of the staggering circuit 10.

The latter consists of a delay circuit which delays by different amounts the impulses which may be applied to it by the tubes 5, 6 and 7 respectively. In the example shown, it has been assumed that it is the impulse from tube 7 which which is most delayed, but it is clear that the sequence of the code pulse elements may take place in any desired order.

The analysis impulse 124 is obtained as follows:

The inductance coil 35 of the last generator is a coil with a mid-point tap, each half of which gives, in connection with the capacitor 36, the signal 14 with respectively opposite polarities. The anodes 37 and 38 of a double triode tube 39 are connected respectively to the two terminals of the coil 35 and thus constitute a device which rectifies the two half periods of the signal 14. The two grids 40 and 41 of the tube 39 are energized simultaneously by the modulated impulse 4. For the duration of this impulse the tube 39 is rendered inoperative and no anode current flows through it until the end 9 of the impulse and the time when a positive peak of the signal is applied to one or the other of its plates 37 or 38, the detection threshold of the tube being determined by the bias of the cathodes 42 given by a circuit 43.

It has been seen that the delay given by the line 20 is equal to $T/2^N$, or, in the example considered, to T/8. Under such conditions a single positive peak appears before the beginning of the damping of the signal 14 and the analysis pulse 16 is received on the terminals of the load resistor 44 of the cathodes 42. It has already been seen above how this impulse 124 applied to the control grids of the tubes 5, 6 and 7 makes it possible to analyze the polarity of signals 12, 13, 14 applied to the suppressor grids of 5, 6, 7 respectively.

It is obvious that in practice the tube 39 will have to be connected to an auxiliary circuit such as a multi-vibrator with two equilibrium positions, enabling the production of an impulse 16 having suitable characteristics and preventing the splitting of this impulse whatever may be the time of the ending of the oscillations 12 to 14. On Figure 3 it has been assumed that the said multivibrator is comprised of a double triode 109. This multivibrator (or trigger circuit), the rest condtion of which corresponds to the right-hand triode being conducting, receives a first triggering signal on its control grid 110 in the following manner: the signal 4, after its polarity has been reversed through transformer 111, delivers a signal 112 which is further differentiated with respect to time by action of condenser 113 before being applied to the control grid 110. The negative peak 114 of the differentiated signal 115 then triggers the left-hand triode 109.

On the other hand, the signal 116 received at the terminals of resistor 44 can in some extreme cases include two positive peaks instead of the single pulse 16 originally represented on Figure 3. This signal 116 has then its polarity reversed through transformer 117 before being applied to the control grid 118 of the triode 109, its shape being represented at 119. The first peak of 119 triggers 109 in a direction opposite to that precedently caused by 114, thus making 109 return to its rest condition.

As a consequence of the two successful triggerings a signal 120 is obtained at 121 from the anode of 109, which signal, after being further differentiated with respect to time by the circuit 122 which is so dimensioned as to have a small time-constant, gives the signal represented at 123—124. The positive peak 123 is then used to operate tubes 5, 6 and 7.

The pulse 124 will be, in any case, single-peaked, even if pulse 116 is definitely a double-peaked one, as represented on Figure 3, because as the first peak of 116 triggers 109, its second peak will have no effect, the signal 120 remaining thus unaffected. Moreover, the pulse 124 which is obtained by differentiating the trailing edge of 120 has a well-defined position in time, as this trailing edge only depends on the first pulse of 116.

It is clear, further, that the generators 1 to 3 may be realized in any suitable manner and may comprise, for instance, controlled oscillators such as transitron type oscillators, and the diagram of Figure 3 must be considered only as an example of the devices utilizable for effecting the functions of the assemblies shown schematically in Figure 2.

The tubes 5, 6 and 7 which, in the example given, are pentodes, may be replaced by other types of tubes, pentagrids for instance.

It will be noted that the system described is sensitive only to the duration of the original impulse; it might therefore be used also in case the incoming impulse is modulated in duration by a displacement of its trailing edge or by a simultaneous displacement of its two edges, as indicated previously. In both cases, however, the coded signal will be created at the time of appearance of the trailing edge of the original impulse, i. e. at an instant which varies according to the modulation, which would then require the provision of auxiliary arrangements delivering the coded signals at suitably chosen times. Since devices of this type cause a complication of circuits, it is preferable to utilize original impulses modulated by displacement of their leading edge, although the invention in its broadest aspects applies to the various types of original impulses, duration modulated.

Figure 4 is a diagram of a system for the transmission of coded impulses, applicable to original position modulated impulse, i. e. modulated by displacement in time.

The incoming signal, shown at 45 is a short impulse included between the two extreme modulation limits 46 and 47 having between them a time difference T. The modulator, not shown, which supplies this signal, also delivers an impulse fixed in time 48, whose end coincides with the limit time 47 of the impulse 45 and the pulse 48 may be obtained in any known manner.

The system of Figure 4 utilizes rectangular impulse signal generators 49, 50, 51 respectively, each one corresponding to an element of an impulse code. These generators supply rectangular impulses followed by an interval of equal duration with a recurrence period $T/2^{n-1}$ for the $n$th generator. In the example shown, the respective recurrence periods of the generators 49, 50 and 51 are thus T, T/2, T/4. All these signals begin at the same time as the variable impulse 45 and have a total duration equal to T, so that the number of peaks of the $n$th signal is $2^{n-1}$. Thus the signal 52 from the generator 49 comprises an impulse of a duration T/2, the signal 53 produced by the generator 50 comprises two impulses, each having a duration T/4 and the signal 54, produced by the generator 51 has four impulses, each of a duration T/8.

These signals are applied respectively to three electronic interrupters 55, 56, 57 supplied on the other hand with an analysis impulse 58 from a generator 59. The latter generator is controlled in a manner similar to that which has been described in connection with Figure 2, by a selector device 60, which receives, on one hand an impulse 48 (having a similar effect to that of the end 9 of the signal 4 of Figure 2) and, on the other hand, an impulse signal 61 delivered by the last generator 51 after having been delayed in a device 62. The delayed signal 61 is derived from a signal 63 produced in the generator 51 and consisting of a group of short impulses each one of which coincides with an ascending or descending edge of the rectangular signal 54. The signal 61 thus comprises $2^N$ impulses, i. e. a number equal to the number of different levels or slices to be discriminated.

The selector 60 delivers to the generator 59 an impulse 64 corresponding to the first impulse of the signal 61, which appears during the impulse 48 whose duration is made equal to $T/2^N$, i. e. T/8 in the case of the figure. Further, the time delay given by the circuit 62 is adjusted to the value $\frac{1}{2} \times T/2^N$ so that the impulse 64 appears in the middle either of a top or of a trough of the signal 54, for the same reasons as in the case of the "quantification" circuit of Figure 2. The delay given by the circuit 62 is here T/16.

Under the action of the impulse 64, the generator 59 provides the analysis impulse 58 with the desired characteristics so that it can actuate the electronic interrupters 55, 56 and 57 each of which passes the impulse 58 only when the respective signals 52, 53 and 54 applied to it on the other hand offers, for instance, a top value at the time considered.

A mixer circuit, consisting, for instance, of a delay circuit receives the pulses which have passed the interrupters 55 to 57 and thus provides a code signal 66. As in the preceding example it has been assumed that this signal includes only the first and last impulses of the code, i. e. it corresponds to a value $2^2+2^0=5$.

According to the invention, each rectangular signal generator is supplied from the previous one, the signal produced by any generator beginning either with an ascending or descending edge of the signal supplied by the previous generator. This arrangement makes it possible to ensure a strict synchronism between the signals 52, 53 and 54. It may be noted, however, that a slight time delay occurs from one generator to the next one, and that the successive rectangular signals do not begin strictly with the impulse 45. Suitable means for compensating this delay will be indicated later in connection with Figure 5.

Figure 5 is a more detailed electrical diagram of a coder system embodying the characteristics of the system of Figure 4.

The incoming signal 45 is applied to the control electrode of an electronic tube 67 biassed to cut-off voltage by a suitable cathode circuit 68. The anode circuit of the tube 67 comprises a delay line 69 whose input terminals are arranged in series with the integrating capacitor 70. This end of the line is matched by an impedance 71 while the other end is open and causes reflection of the incoming signals. The back and forth propagation time of the line 69 is T/2. Under such conditions there is obtained, at the connection point 72 of the capacitor 70 with the line 69 a signal 52 which in the case considered is a negative pulse of duration T/2 beginning with the pulse 45 which effectively makes the tube 67 conducting and immediately decreases the voltage at point 72.

Further, at the input of the delay line 69, at point 73, a signal 74 is received, consisting of two short negative impulses, the first of which coincides with the time of appearance of the pulse 45, and the second of which, delayed by T/2, comes from the reflection of this pulse 45 at the open end of the delay line 69. The pulse 52 is also present at point 73 but it has at that point a level sufficiently low with respect to the signal 74 for its effect to be negligible.

The assembly constituted by the electronic tube 67, the delay line 69, the capacitor 70 and the matching resistance 71 corresponds to the generator 49 of Figure 4. Two other similar assemblies correspond to the generators 50 and 51. These other assemblies respectively use electronic tubes 75 and 76 and delay lines 77 whose back and forth propagation time is equal to T/4 and 78 having a total propagation time equal to T/8.

The primary winding of a transformer 79 is connected to point 73 and its secondary winding is connected to the control electrode of the tube 75. It thus applies to this tube a signal 80, which is the signal 74 inverted. The tube 75 is normally biassed to cut-off voltage by a cathode circuit 81. When it receives the signal 80, it becomes conducting, pending the duration of each impulse of this signal and causes the formation of the signal 53 which is received at 82 on the lower potential input terminal of the delay line 77. On the other input terminal, at point 83, a signal 84 is also received comprising four short impulses, the first and third ones of which respectively correspond to the two pulses of the signal 80 and the second and fourth ones of which are caused by the reflections of these two pulses of the signal 80 in the delay line 77.

The signal 53 consists of two negative impulses of a duration T/4 separated by an interval having also a duration T/4 the first impulse beginning with the first pulse of the signal 80, i. e. with the signal 45.

By a succession of similar operations, the signals 54 are also obtained, these signals consisting of four pulses of a duration T/8 separated by voids equal to T/8 and the signal 61 consisting of eight short pulses also separated by T/8.

As mentioned in connection with Figure 4, the signal 61 is utilized for the "quantification," i. e. for determining the correct instant for the analysis of the signals 52, 53 and 54 in such a manner that this analysis takes place during a top or trough of these signals and not during the passage from a top to a trough or inversely. This quantification function is insured by an electronic tube 85 which may be, for instance, a pentode tube. This tube is normally biassed to its cut-off voltage by a suitable cathode circuit and is made operative only during the duration of the impulse 48 which is applied to its control electrode 87. On the other hand, the signal 61 is applied to the suppressor grid 88 of the tube 85. As previously indicated, the signal 48 has a duration T/8 and its end coincides with the instant 47 of the maximum modulation of the original impulse 45. Due to this fact, the electrode 88 receives only a single impulse of the signal 61 while the tube 85 delivers its electronic emission. This single short pulse deflects the maximum electronic current of tube 85 towards the screen electrode 89 and thus causes a negative impulse 90 to appear at the terminal of this screen electrode.

A feedback capacitor 91, connected between the screen electrode 89 and the suppressor grid 88 gives a circuit characteristic with two stability positions and ensures a more regular operation of the quantification device in case of limiting positions where two signal impulses 61 would exactly frame-in the pulse 48.

A transformer 92 inverts the pulse 90 and delivers an impulse 64 to the control grid of an electron tube 93 normally biassed to its cut-off voltage by a circuit 94. The positive impulse 64 triggers the anode current of the tube 93 whose anode circuit is closed on a delay line 95 comprising three output terminals 96, 97 and 98 respectively, and whose end is closed on a matching impedance 99.

The negative impulse 58, received at point 96 with a time delay slightly shorter than T/16 energizes the suppressor grid 100 of an electronic tube 55 corresponding to the electronic interrupter designated by the same reference numeral as in Figure 4. The control electrode 101 of this tube is also connected to the point 72 of the circuit of the tube 67 and thus receives the signal 52 which blocks the flow of the electron current in the tube 55 pending the duration T/2 of the negative impulse of this signal. According to the instant when the signal 58 occurs with respect to the signal 52, a negative code impulse is obtained or not on the screen electrode 102 of the tube 55, this electrode being connected at 103 to the delay line 65.

Two other electronic tubes 56 and 57, respectively, constitute the interrupters corresponding to the two signal generators which produce the rectangular signals of durations T/4 and T/8 respectively; their respective suppressor grids are energized successively by impulses 108 and 107 from successive terminals 97 and 98 of delay line 95; their screen electrodes are connected respectively to the points 104 and 105 of the delay line 65 which makes it possible to receive and spread in time in a predetermined manner the code impulses eventually appearing on these screen electrodes so as to obtain at the output of line 65 the coded signal 66.

It has until now been assumed that the signals 52, 53 and 54 were produced simultaneously but it is obvious that they are actually slightly offset with respect to each other due to the propagation time of the signals from the control electrode of the tube 67 to point 106, at the output of the delay line 78 corresponding to the third generator of rectangular signals.

It is to compensate for this transmission delay that a spreading of the taps 96, 97 and 98 is provided for on the delay line 95. The propagation time of the line 95 up to the point 98 is equal to T/16 as in the case of the circuit 62 playing the same part in Figure 4, so that the analysis impulse 107 reaches the tube 57 at the correct time, i. e. in coincidence with the mid-point either of a top or of a trough of the signal 54, corresponding to the lowest elementary step of the code, so as to ensure a perfectly regular coding by a sharp definition of the presence or absence of a top of this signal 54 at the time of analysis. Further, the impulses 58 and 108 received at points 96 and 97 appear with time shifts which compensate for the relative delays between the beginnings of the signals 52, 53 and 54.

It will be obvious to skilled technicians that the cricuits of Figure 5 must be completed, in practice, by auxiliary circuits of a known type, their purpose being to regenerate the shapes of the pulses at suitable points, for instance at the output of the coding device.

It may be noted, as in the case of Figure 3, that the reference impulse 48 has a constant recurrence period which makes possible a direct transmission of the coded signal. On the other hand, if the analysis occurred at a variable instant of the recurrence period of the original modulated impulses, it would be necessary to utilize auxiliary recording devices followed by arrangements for delivering the coded signals at the proper times.

Although the present invention has been described in connection with certain particular examples of embodiment, various modifications incorporating the characteristics of the invention are possible but it must be understood that these modifications are within the scope of the invention.

What is claimed is:

1. An electronic translating device for converting modulated recurrent electric impulse energy, the modulation of which is constituted by a continuous variation of their duration or of their position in time with respect to predetermined recurrent instants, the maximum extent of said variation being equal to a predetermined time interval T, into a multi-unit code, comprising means responsive to the arrival of a modulated impulse for producing a plurality of series of periodic pulsations, the series being equal in number to the number N of coded elements, the pulsation periods of the respective series being related to the maximum value T in proportion with consecutive integer powers of ½, means responsive to an impulse occurring at a predetermined instant in the recurrence period of the original impulses to analyze said pulsations, and means for producing a code impulse in response to each of said pulsations which present at the instant of analysis a predetermined polarity.

2. A coding and transmitting device for converting modulated recurrent electric impulse energy, the modulation of which is constituted by a variation of maximum value T of the duration of the impulses, into a multiunit code including an integer number N of code elements, comprising generators of sinusoidal wave trains in number equal to that of the code-elements and having respectively periods which decrease by one-half from one generator to the next, said periods being T, $T/2^1$ . . . $T/2^{N-1}$, means whereby each of said generators is triggered by the leading edge of a duration-modulated impulse delayed by $T/2^N$ by a delay circuit and ceases its operation at the end of this delayed impulse, a generator of analysis impulses triggered by the end of the initial duration-modulated impulse, an auxiliary circuit determining exactly the instant of appearance of said analysis impulses, said auxiliary circuit consisting of a rectifier for the sinusoidal wave-train having the shortest period, means whereby the rectified voltage from said rectifier controls said analysis impulse generator in such a manner that it operates only at a time close to a maximum or a minimum of said sinusoidal wave train having the shortest period, electronic interrupters in number equal to that of the code elements, means by which each of said electronic interrupters is controlled, on the one hand, by the sinusoidal wave trains delivered by one of said generators, and on the other hand by said analysis impulses in such a manner that they deliver a code impulse only for a determined polarity of the sinusoidal signal at said instant of analysis, and a delay circuit staggering said simultaneously generated code impulses in time in a predetermined order and with predetermined time intervals.

3. A translating device for converting modulated recurrent impulse energy, the modulation of which is constituted by a variation of maximum value T of the time position of the impulses, into a multi-unit code including an integer number N of code elements comprising rectangular impulse generators in number N equal to that of the code elements and delivering series of impulses of total duration T, the duration of each impulse of each of said series being equal to the time interval separating two consecutive impulses of the same series and being respectively equal for the various generators to T/2, $T/2^2$ . . . $T/2^N$, means responsive to the occurrence of the original modulated impulse for triggering the one of said generators having the longest impulse period, means for triggering in sequence each successive one of said generators in response to the operation of the one having the next longer impulse period, a generator of analysis impulses, means response to a short impulse of duration $T/2^N$, occurring at the end of each modulation interval T for triggering said generator of analysis impulses, means for determining exactly the instant of appearance of said analysis impulses comprising a generator responsive in part to the operation of the rectangular pulse generator having the shortest period and operating to produce a group of short impulses each of which coincides with an edge either ascending or descending of said last-mentioned impulses, said last mentioned means including also circuit connections including a delay circuit, said means causing the analysis impulse generator to operate at an instant close to the center of a top or of a trough of said rectangular impulses of the shortest period, electronic interrupters in number N equal to that of the code elements, a delay device for distributing in time the analysis impulses to said interrupters, the successive delays applied to the analysis impulses being respectively equal to the time shifts existing between the impulses of the decreasing periods produced by the first-mentioned generators, and means for controlling each of said interrupters on the one hand by said rectangular impulses of one of the first-mentioned generators and on the other hand by the said analysis impulses so that the said interrupters produce code impulses only on the simultaneous occurrence of a rectangular impulse and of an analysis impulse, and a delay circuit staggering simultaneously generated code impulses in time in a predetermined order and with predetermined time intervals.

PAUL FRANÇOIS MARIE GLOESS.
LOUIS JOSEPH LIBOIS.

REFERENCES CITED

The following references are of record in the file of this patent:

UNITED STATES PATENTS

| Number | Name | Date |
|---|---|---|
| 2,141,237 | Connery | Dec. 27, 1938 |
| 2,248,583 | Potts | July 8, 1941 |